L. JANISCH.
SYSTEM OF MOTOR CONTROL.
APPLICATION FILED SEPT. 1, 1909.

971,199.

Patented Sept. 27, 1910.
4 SHEETS—SHEET 1.

WITNESSES:
J. Earl Ryan
J. Ellis Glen

INVENTOR:
LEOPOLD JANISCH,
BY Albert S. Davis
ATT'Y

L. JANISCH.
SYSTEM OF MOTOR CONTROL.
APPLICATION FILED SEPT. 1, 1909.

971,199.

Patented Sept. 27, 1910.
4 SHEETS—SHEET 2.

WITNESSES.
J. Earl Ryan
J. Ellis Glen

INVENTOR:
LEOPOLD JANISCH,
BY
ATT'Y

L. JANISCH.
SYSTEM OF MOTOR CONTROL.
APPLICATION FILED SEPT. 1, 1909.
971,199.
Patented Sept. 27, 1910.
4 SHEETS—SHEET 3.
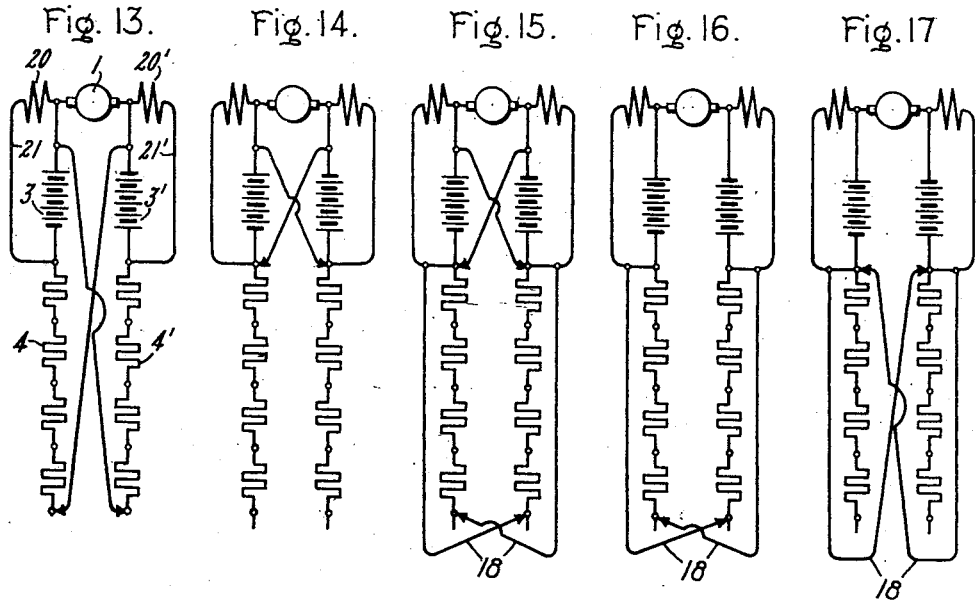
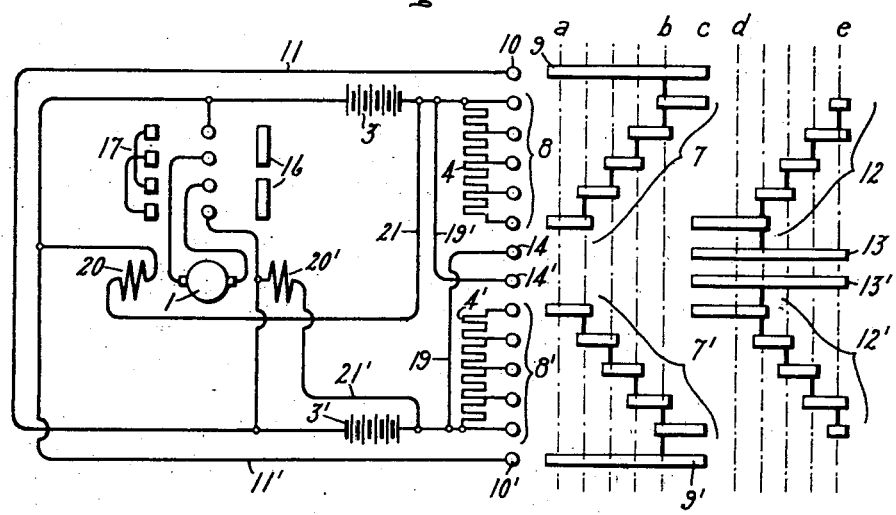
WITNESSES:
J. Earl Ryan
J. Ellis Elen
INVENTOR:
LEOPOLD JANISCH,
BY
ATT'Y.

L. JANISCH.
SYSTEM OF MOTOR CONTROL.
APPLICATION FILED SEPT. 1, 1909.
971,199.
Patented Sept. 27, 1910.
4 SHEETS—SHEET 4.
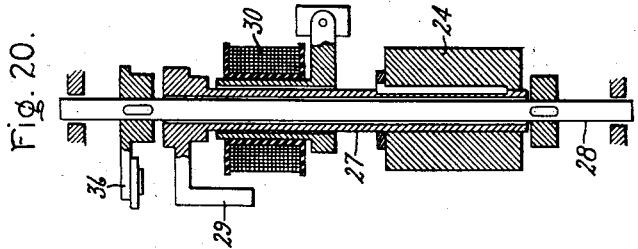
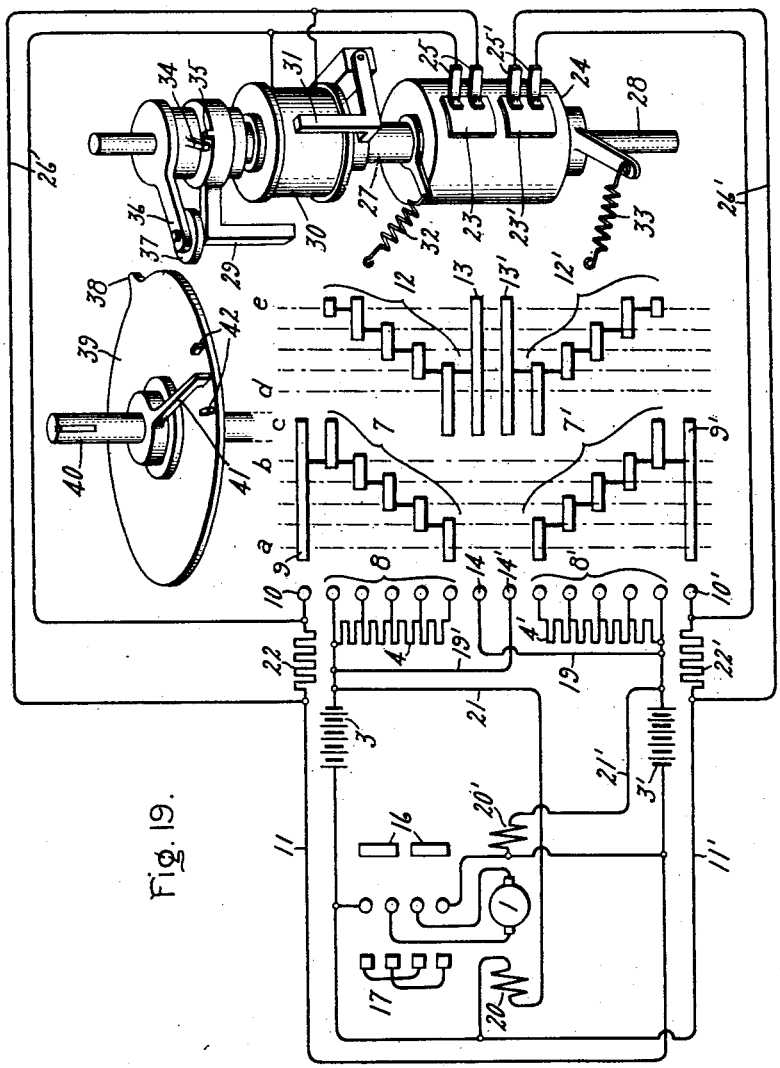
WITNESSES:
J. Earl Ryan
J. Ellis Elen.
INVENTOR:
LEOPOLD JANISCH,
BY
ATT'Y.
THE NORRIS PETERS CO., WASHINGTON, D. C.

UNITED STATES PATENT OFFICE.

LEOPOLD JANISCH, OF BERLIN, GERMANY, ASSIGNOR TO GENERAL ELECTRIC COMPANY, A CORPORATION OF NEW YORK.

SYSTEM OF MOTOR CONTROL.

971,199.  Specification of Letters Patent.  Patented Sept. 27, 1910.

Application filed September 1, 1909. Serial No. 515,639.

*To all whom it may concern:*

Be it known that I, LEOPOLD JANISCH, a subject of the Emperor of Germany, residing at Berlin, Germany, have invented certain new and useful Improvements in Systems of Motor Control, of which the following is a specification.

This invention relates to methods of controlling the speed of electric motors, especially those used to propel vehicles and supplied with current from storage batteries.

It is common practice to divide the battery into two portions, which are connected in parallel for starting or in series for running.

The object of the present invention is to permit the transition from one kind of connection to the other without interruption of the torque.

The invention is applicable to series, shunt or compound motors, and the features of novelty will clearly appear from the following detailed description and claims.

Figure 6:
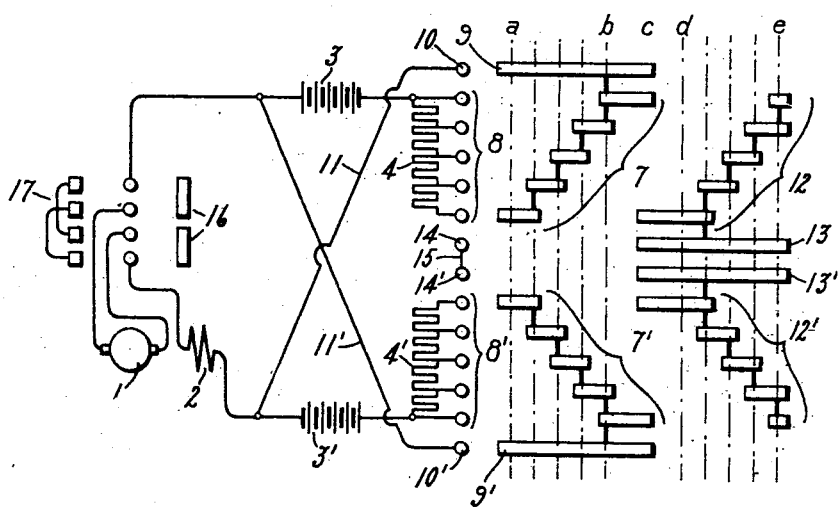
Figure 7:
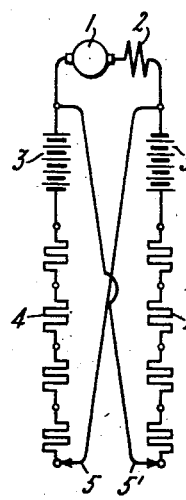
Figure 8:
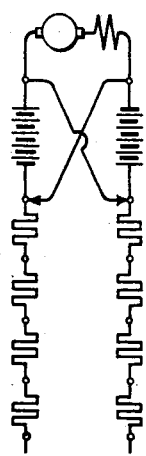
Figure 12:
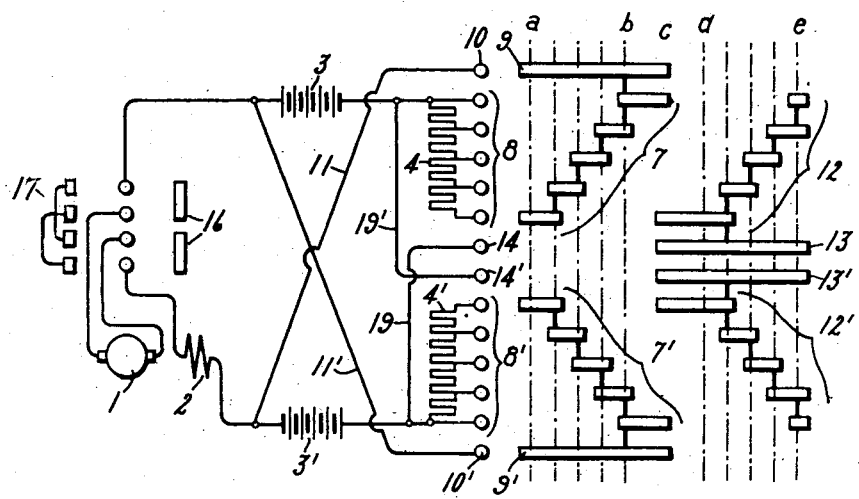

In the accompanying drawings, Figures 1 to 5, inclusive, are diagrams showing the consecutive changes in connections in carrying out the invention with a series motor; Fig. 6 is a diagram showing a controller adapted to make these connections; Figs. 7 to 11, inclusive, are diagrams illustrating a modification of the system as applied to a series motor; Fig. 12 is a diagram showing the controller used in making the connections in Figs. 7 to 11; Figs. 13 to 17 show the invention in connection with a shunt motor; Fig. 18 is a diagram showing the controller used therewith; Fig. 19 shows partly in diagram and partly in perspective a controller like that in Fig. 18, but provided with means for protecting the batteries in switching back from the first series to the last parallel position; and Fig. 20 is a longitudinal section of a portion of the mechanism of said controller.

Figure 1:
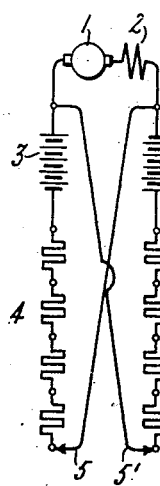
Figure 2:
Figure 3:
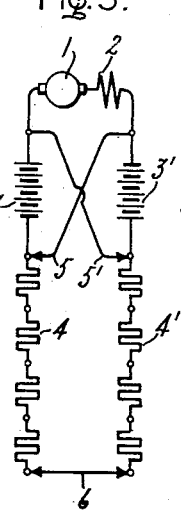
Figure 4:
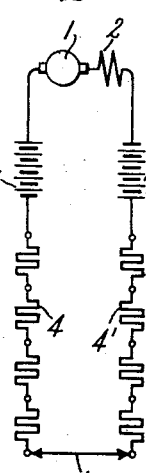
Figure 5:
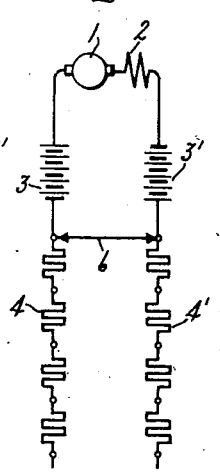

Referring first to Figs. 1 to 6, the motor, comprising an armature 1 and a field winding 2, is situated between the two portions of the storage battery, which for convenience will be hereinafter referred to as batteries 3, 3'. In the first running position, Fig. 1 (*a* Fig. 6) the whole of a starting resistance is in series with each battery, the two rheostats 4, 4' being similar. The movable switch-point 5 of the rheostat 4 is connected to the positive pole of the battery 3', while the movable switch 5' of the rheostat 4' is connected to the negative pole of the battery 3. The two batteries and their resistances are, therefore, in parallel. In the succeeding running positions the resistances are cut out simultaneously, step by step, until in the last parallel position, Fig. 2 (*b* Fig. 6) the resistances are all cut out of circuit, each being connected at one end only with its respective battery portion, the other ends being free. In passing to the series arrangement of the battery portions, these free ends are first connected directly together by a conductor 6 (Fig. 3). The point in the controller at which this occurs is indicated by the letter *c* in Fig. 6, but this is not a positive controller step, but merely a transitory position in passing from the last parallel to the first series position. On arriving at this latter position (*d* Fig. 6; Fig. 4) the motor, the two battery portions, and the two resistances are all in series; the two switches 5, 5' being entirely out of circuit. The succeeding steps of the controller cut out the resistance coils successively until they are entirely out of circuit, and the two batteries are in series with themselves and with the motor. Referring now especially to Fig. 6, the controller is shown to have a drum carrying a duplex set of similar stepped segments 7, 7' connected together and corresponding in number with the fingers 8, 8' connected with the taps led out from the coils of the two resistances 4, 4'. Above and below the segments 7, 7' are the two long segments 9, 9' covering the entire range of the segments 7, 7' with which they are respectively connected, and coöperating with fingers 10, 10' respectively connected by wires 11, 11' with the positive pole of the battery 3' and the negative pole of the battery 3. These conductors correspond with the movable switch elements 5, 5'. The segments 7, 7' cover the parallel connection of the batteries. The controller cylinder carries also a duplex set of similar stepped segments 12, 12' covering the series connection of said batteries. The segments in each set are connected together and are also respectively connected to the two intermediate segments 13, 13' which cover the entire range of the segments 12, 12' and coöperate with fingers 14, 14' which are connected by a link 15, corresponding with the conductor 6 in Fig. 3, 4 and 5. A reversing switch has segments 16 for forward running and segments 17 for backward running, as usual. By tracing out the circuits, it will be found that the successive movement of the segments over the fingers from position *a* to position *e* will produce the circuit connections shown in diagram in Figs. 1 to 5, inclusive.

Figure 9:
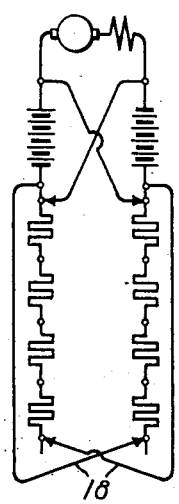
Figure 10:
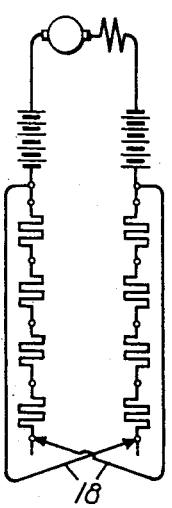
Figure 11:
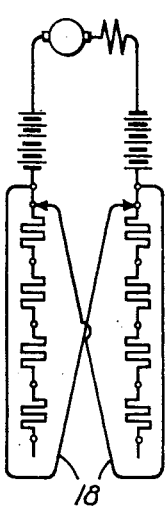

In the modification shown in Figs. 7 to 12, inclusive, the connections are somewhat varied when passing from parallel to series at Fig. 9. Instead of directly connecting the free ends of the two resistances 4, 4', said ends are cross-connected, the free end of each being connected with the other end of the other resistance respectively, by means of the movable switches 18. This places the resistances in parallel with each other and in series with the two batteries, an arrangement which permits the flow of current in the earlier series positions to be more nearly equal to that in the later positions, so as to avoid loading the controller contacts too heavily at any given position. Moreover, in changing the circuit connections to run the motor up to full speed, there is less sparking at the contacts, because the current in each resistance is but half of the entire output of the two batteries. The controller diagramed in Fig. 12 is the same as that in Fig. 6, except that the two fingers 14, 14' instead of being connected by the link 15, are respectively connected by the wires 19, 19' with the negative pole of the battery 3' and the positive pole of the battery 3.

Figs. 13 to 18, inclusive, show the application of this invention to a shunt motor having its field winding divided into halves 20, 20', each of which is connected in a shunt 21, 21' around a battery. With shunt and compound motors, however, a certain difficulty is experienced in switching back from the series connection of the battery to the parallel connection. While the motor is operating at a speed corresponding to one of the positions of the controller in which the batteries are arranged in series, the counter electromotive force generated by it may be considerably higher than the voltage furnished by one of the groups of batteries. If, therefore, the controller is thrown from the first series position back to the last parallel position, the voltage furnished by the motors operating as generators may be much higher than the voltage of the batteries, with the result that an excessively high charging current is supplied to the batteries with consequent damage to the latter. In order to avoid this trouble, a protective resistance is provided, which is automatically cut into circuit when the controller is turned back to the last parallel position; but said protective resistance is cut out or short circuited when the controller is being turned forward through this last parallel position. For producing this result, any suitable devices may be employed; but I prefer those shown in Figs. 19 and 20. The controller diagramed in Fig. 19 is the same as that shown in Fig. 18, except that in each of the conductors 11, 11', running respectively from the positive and negative terminals of the batteries 3, 3' to the fingers 10, 10' of the controller, there is interpolated a protective resistance 22, 22'. These resistances can be short circuited by bridging contacts 23, 23' on a rotatable drum 24 coöperating with fixed fingers 25, 25' connected by wires 26, 26' to opposite ends of the protective resistances. The drum is keyed to a sleeve 27 rotatable on a shaft 28 and carrying an arm 29 of magnetic metal. Adjacent to and preferably surrounding the sleeve is a stationary electromagnet 30, whose core has a pole piece 31 projecting into the path of revolution of the arm 29. A spring 32 biases said arm away from said pole piece. The shaft 28 is held yieldingly in a given position by a spring 33. A finger 34 on the shaft is adapted to engage a lug 35 on the hub of the arm 29, so that angular movement of the shaft in one direction will be communicated to the arm and the drum. The shaft also has a lever arm 36, preferably provided with an antifriction roller 37 adapted to be struck and actuated by a tappet 38 on a disk 39 mounted on the controller shaft 40. A certain amount of lost motion is allowed by mounting the disk loosely and actuating it by a driver 41 taking against one or the other of two lugs 42 on the disk on either side of said driver. The electromagnet may be connected to the wires 26 in parallel with one of the protective resistances.

The operation is as follows: Assume the motor to be running at full speed with the batteries connected in series. Now let the controller be turned backward into the last parallel position *b*. Just as the fingers 8, 8' are passing the intermediate position *c* the tappet 38 strikes the roller 37 on the lever 36 and rocks the shaft 28, carrying the arm 29 against the pole piece 31 of the electromagnet 30, and, by the rotation of the drum, moving the contact plates 23, 23' out from under the contacts 25, 25'. This cuts the protective resistances 22, 22' into circuit with the conductors 11, 11', (corresponding with the crossed switching elements 18 in Fig. 15) and reduces to a safe value this charging current resulting from the high induced voltage of the rapidly running motor, which is opposed only by the voltage of the batteries connected in parallel in position *b*. The electromagnet 30, being connected in shunt to resistance 22, receives current proportional to that in the motor circuit. The magnet 30 is, therefore, strongly energized, and attracts and holds the arm 29 until, by the reduction in speed of the motor, the energizing current becomes so weak that the spring 32 can pull the arm 29 away from the pole piece 31 and return it to its normal position. This operation also brings the contact plates 23, 23' back under the contacts 25, 25', thereby cutting out the protective resistances; but this is now of no consequence, because the weakened motor current cannot now injure the batteries.

When the controller is turned forward in speeding up the motors, the tappet rocks the shaft 28 in the same manner as when the disk is turning backward; but owing to the lost motion between the driver 41 and the lugs 42, this action is delayed until the controller has passed into the first series position $d$. No effect is produced then, because the fingers 10, 10' have passed off the segments 9, 9' and the protective resistances are no longer in circuit. The invention is also applicable to systems in which two generators are employed as sources of current instead of two storage batteries.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is,—

1. In a series-parallel system of control for an electric motor, the combination with two sources of current, of two starting resistances, one connecting the positive poles and the other the negative poles of said sources.

2. In a series-parallel system of control for an electric motor, the combination with two sources of current, of two starting resistances, respectively connecting like poles of said sources, and means for simultaneously cutting out said resistances step by step.

3. The combination with a motor, of two sources of current having unlike poles connected to the terminals of said motor, two resistances respectively connected at one end to the other poles of said sources, means for connecting the free end of each resistance with that pole of the other source corresponding with that of the source to which the fixed end of said resistance is connected, and means for simultaneously shifting said connections from the free ends to the fixed ends of said resistances.

4. The combination with a motor, of two sources of current having unlike poles connected to the terminals of said motor, two resistances respectively connected at one end to the other poles of said sources, means for connecting the free end of each resistance with that pole of the other source corresponding with that of the source to which the fixed end of said resistance is connected, means for simultaneously shifting said connections from the free ends to the fixed ends of said resistances, and means for directly connecting the free ends of said resistances just before finally breaking the shifting connections.

5. The combination with a motor, of two sources of current having unlike poles connected to the terminals of said motor, two resistances respectively connected at one end to the other poles of said sources, means for connecting the free end of each resistance with that pole of the other source corresponding with that of the source to which the fixed end of said resistance is connected, means for simultaneously shifting said connections from the free ends to the fixed ends of said resistances, means for directly connecting the free ends of said resistances just before finally breaking the shifting connections, and means for simultaneously changing the direct connection from the free ends to the fixed ends of said resistances.

6. The combination with a motor having a shunt field winding divided into two parts, of two sources of current respectively in shunt to said windings, two resistances respectively connected at one end to unlike poles of said sources, means for connecting like poles of said sources through said resistances, and means for directly connecting the free ends of said resistances, both kinds of said connections being shiftable simultaneously along said resistances.

7. In a series-parallel system of motor control, the combination with two batteries, means for connecting them in parallel and in series, a protective resistance, means for interpolating said resistance in the battery circuits when passing from series to parallel connection, and means for automatically keeping said protective resistance in circuit so long as the motor current exceeds a predetermined magnitude.

8. The combination with a motor, of two batteries, a controller for connecting them in parallel and in series, a protective resistance, a shunt around said resistance which is closed when the controller turns forward through the last parallel position, and means for opening said shunt when the controller is turned backward from series to parallel connection.

9. The combination with a motor, of two batteries, a controller for connecting them in parallel and in series, a protective resistance, a shunt around said resistance, contacts for opening said shunt when the controller is turned backward from series to parallel connection, and an electromagnet energized by the motor current and operating to hold said contacts open so long as said current exceeds a predetermined magnitude.

10. The combination with a motor, of two batteries and a controller, a protective resistance for said batteries, a shunt around said resistance, a drum carrying contacts controlling said shunt, a shaft on which said drum is loosely sleeved, a lever arm on said shaft adapted to be actuated by the controller, an arm on the sleeve adapted to be angularly moved by the lever arm, and a stationary electromagnet arranged to attract and hold the arm on the sleeve, said magnet being in shunt to said resistance.

In witness whereof, I have hereunto set my hand this 19th day of August, 1909.

LEOPOLD JANISCH.

Witnesses:
JULIUS RUNDAUD,
OSKAR SINGER.